Patented Aug. 3, 1926.

1,594,879

UNITED STATES PATENT OFFICE.

HARRY ESSEX AND ALGER L. WARD, OF WILMINGTON, DELAWARE, ASSIGNORS TO E. I. DU PONT DE NEMOURS & COMPANY, OF WILMINGTON, DELAWARE, A CORPORATION OF DELAWARE.

PROCESS OF MAKING HALOHYDRINS.

No Drawing.   Application filed November 22, 1919. Serial No. 340,074.

This invention relates to a process of making from a substituted propylene halohydrins suitable for conversion into glycerine, and comprises inducing a reaction between water, chlorine, and said substituted propylene at a low temperature.

One object of this invention is to provide an efficient and inexpensive process of obtaining dichlorhydrins which may be employed in synthesizing glycerine.

Another object of this invention is to provide an improved process of converting allyl halides into the corresponding glycerine halohydrins by the chemical addition of the Cl— and OH—radicals of hypochlorous acid, in order to render this reaction commercially feasible as a step towards the manufacture of glycerine.

According to the present invention, glycerine halohydrins may be readily and cheaply prepared and with high yields by the simple procedure of passing chlorine into an agitated and cooled mixture of an allyl halide and water. The reaction is complete when the solution retains a persistent yellow color. In order that concentrated solutions of halohydrins be formed, or, in the case of sparingly soluble halohydrins, in order that the ratio of halohydrin produced to the water used be high, it is desirable that the solution, which normally increases in acidity with the progress of the reaction, be neutralized from time to time.

The temperature of the reaction mixture should be kept low and preferably below 20° C. throughout the operation. We have found that at high temperatures the reaction between water, chlorine and allyl halides is influenced in undesirable directions, resulting in the formation of considerable quantities of trihalogenhydrins and higher substituted products. In an experiment in which water at the boiling point was treated with allyl chloride and chlorine, the yield of dichlorhydrins was very low, which result may be attributed to the recognized instability of hypochlorous acid at this temperature.

If allyl chloride be used the principal reaction which takes place may be represented by the equation:—

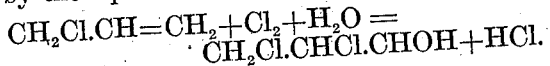
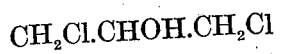

Smaller quantities of the isomeric dichlorhydrin $$CH_2Cl.CHOH.CH_2Cl$$

are formed at the same time. Both of these dichlorhydrins are suitable for the production of glycerine. Glycerine 1, 2, 3-trichlorhydrin is difficult to convert to glycerine, but is not formed to any extent in operating in the indicated manner, provided the temperature conditions specified are observed and provided it is not attempted to push the ratio of chlorhydrin produced to water used, to extreme limits.

It will be noted that by employing chlorine gas instead of hypochlorous acid the formation of additional water is avoided with the resulting important advantage that the dichlorhydrins are precipitated in a saturated solution and may be collected in undiluted form without further separation or purification.

Allyl halides suitable for the herein described synthesis of glycerine may be readily prepared by passing the vapors of dihalogenpropanes over hot calcium chloride. However, allyl halides, by whatever means prepared, are suitable as raw materials for this synthesis of glycerine and we, therefore, do not limit ourselves to allyl halides from the above source.

We have found that glycerine monochlor- and dichlorhydrins are readily hydrolyzable to glycerine and with high yields, differing in this respect from the trichlorhydrin which has been repeatedly suggested as an intermediate for the synthesis of glycerine and which was used in the classical glycerine synthesis of Friedel and Silva. Our experience has shown that whereas it is difficult to obtain yields of glycerine higher than 20% by hydrolysis of the trichlorhydrin, yields in excess of 90% may be readily obtained by hydrolysis of the mixtures of dichlorhydrins or of the mixture of monochlorhydrins, obtained by the addition of the component radicals of hypochlorous acid to allyl chloride or allyl alcohol respectively.

In the embodiment of our invention particularly advantageous, chlorine is passed into a cool agitated mixture of allyl chloride and water, the resulting hydrochloric acid being neutralized from time to time, until the allyl chloride has almost or completely reacted, as indicated by a persistent yellow color of the solution. A small quantity of allyl chloride is then added to the solution to react with any excess chlorine which may be present. The dichlorhydrins formed in this reaction are somewhat soluble in water and remain dissolved until their continued formation results in a saturated solution. The dichlorhydrins produced after the point of saturation is reached separate from the solution as an almost colorless oil.

The conversion to glycerine is easily effected simply by adding an alkaline-reacting substance, as slaked lime or sodium carbonate, in an amount sufficient to facilitate hydrolysis and heating the mixture until hydrolysis is substantially completed; this is preferably done by raising the temperature of the reaction mixture to approximately 100° C., and maintaining it at this temperature for several hours. If desired the addition of an alkaline-reacting substance may be omitted, but in this case the heating must be continued for a longer period.

We claim:—

The process of making dichlorhydrin which comprises precipitating the same by passing gaseous chlorine into a mixture of allyl chloride and a saturated water solution of dichlorhydrin whereby the dichlorhydrins are collected separately from the mixture.

In testimony whereof we affix our signatures.

HARRY ESSEX.
ALGER L. WARD.